(12) United States Patent
Feldermann et al.

(10) Patent No.: US 8,288,456 B2
(45) Date of Patent: Oct. 16, 2012

(54) PROCESS FOR THE PRODUCTION OF IMPACT-MODIFIED FILLED POLYCARBONATE COMPOSITIONS

(75) Inventors: Achim Feldermann, Düsseldorf (DE);
Andreas Seidel, Dormagen (DE);
Michael Bierdel, Leverkusen (DE);
Reiner Rudolf, Leverkusen (DE)

(73) Assignee: Bayer Materialscience AG, Leberkusen (DE)

( * ) Notice: Subject to any disclaimer, the term of this patent is extended or adjusted under 35 U.S.C. 154(b) by 0 days.

(21) Appl. No.: 12/199,194

(22) Filed: Aug. 27, 2008

(65) Prior Publication Data
US 2009/0118394 A1    May 7, 2009

(30) Foreign Application Priority Data
Aug. 30, 2007 (DE) .......................... 10 2007 040 927

(51) Int. Cl.
*C08J 3/20* (2006.01)
*C08K 5/49* (2006.01)
*C08K 3/04* (2006.01)

(52) U.S. Cl. ........ 523/351; 524/121; 524/495; 524/504; 525/64; 525/67; 264/211.23

(58) Field of Classification Search ................. 524/127, 524/121, 451, 495, 504, 576; 523/351; 525/64, 525/67; 264/211.23
See application file for complete search history.

(56) References Cited

U.S. PATENT DOCUMENTS

| | | | |
|---|---|---|---|
| 3,419,634 A | 12/1968 | Vaughn et al. | |
| 3,553,167 A | 1/1971 | Schnell et al. | |
| 3,644,574 A | 2/1972 | Jackson, Jr. et al. | |
| 3,692,744 A | 9/1972 | Rich et al. | |
| 4,075,173 A | 2/1978 | Maruyama et al. | |
| 4,311,823 A | 1/1982 | Imai et al. | |
| 4,713,415 A * | 12/1987 | Lavengood et al. | 525/66 |
| 4,937,285 A | 6/1990 | Wittmann et al. | |
| 5,283,285 A * | 2/1994 | Akkapeddi et al. | 525/67 |
| 5,591,382 A | 1/1997 | Nahass et al. | |
| 5,643,502 A | 7/1997 | Nahass et al. | |
| 5,756,576 A * | 5/1998 | Bruls et al. | 525/66 |
| 6,265,466 B1 | 7/2001 | Glatkowski et al. | |
| 6,777,637 B2 * | 8/2004 | Nakayama et al. | 219/68 |
| 2003/0109612 A1 * | 6/2003 | Seidel et al. | 524/115 |
| 2008/0003170 A1 | 1/2008 | Buchholz et al. | |
| 2008/0033097 A1 * | 2/2008 | Hayata et al. | 524/496 |
| 2008/0071024 A1 * | 3/2008 | Morishita et al. | 525/66 |
| 2008/0132618 A1 * | 6/2008 | Eckel et al. | 524/127 |
| 2008/0176988 A1 * | 7/2008 | Seidel et al. | 524/504 |
| 2010/0249290 A1 * | 9/2010 | Feldermann et al. | 524/127 |

FOREIGN PATENT DOCUMENTS

| | | |
|---|---|---|
| DE | 3 832 396 | 2/1990 |
| EP | 1589079 A | 10/2005 |
| GB | 1 409 275 | 10/1975 |
| GB | 1 552 558 | 9/1979 |
| JP | 2006-083195 | 3/2006 |
| WO | WO 01/92381 A1 | 12/2001 |
| WO | 03/038838 A | 5/2003 |
| WO | WO 03/079375 A1 | 9/2003 |
| WO | WO 2005/015574 A1 | 2/2005 |

OTHER PUBLICATIONS

Machine Translation of JP 2006-083195.*
International Search Report/Written Opinion PCT/EP2008/006795 dates Nov. 18 2008 (11 pages).

* cited by examiner

*Primary Examiner* — Vasu Jagannathan
*Assistant Examiner* — Hannah Pak
(74) *Attorney, Agent, or Firm* — Baker Donelson Bearman Caldwell & Berkowitz, PC

(57) ABSTRACT

The present invention relates to a process for the production of impact-modified filled polycarbonate compositions and molding compositions. A process of the present invention involves: (i) mixing the CNT (component C) with rubber-containing vinyl copolymer (component B) and/or rubber-free vinyl copolymer (component D) on a twin screw extruder, to obtain a CNT masterbatch, (ii) mixing the CNT masterbatch with polycarbonate (component A) and optionally with Component B and/or Component D and optionally with an additive on a twin screw extruder. A polycarbonate composition prepared according to the present invention does not experience degradation of the molecular weight of the polycarbonate during compounding a compared to processes known in the art.

17 Claims, No Drawings

PROCESS FOR THE PRODUCTION OF IMPACT-MODIFIED FILLED POLYCARBONATE COMPOSITIONS

CROSS REFERENCE TO RELATED APPLICATIONS

This application claims priority from DE 102007040927 filed Aug. 30, 2007, the content of which is incorporated herein by reference in its entirety.

BACKGROUND OF THE INVENTION

1. Field of the Invention

The present invention relates to a process for production of an impact-modified polycarbonate composition and/or generally molding composition filled with carbon nanotubes, wherein the degradation of the molecular weight of the polycarbonate during compounding is improved as compared with certain processes known in the art.

2. Description of Related Art

WO-A 2001/92381 describes a process for the incorporation of CNT agglomerates into a polymer matrix by hydrodynamic loading. Breaking up of the agglomerates is achieved in this way.

WO-A 2003/079375 claims polymer material that shows mechanically and electrically improved properties by the addition of carbon nanotubes. The carbon nanotubes are cleaned of catalyst residues and of catalyst support by washing. A process for the production of such reinforced materials by incorporation into the melt is also claimed.

WO-A 2005/015574 discloses compositions containing organic polymer and carbon nanotubes (referred to herein as "carbon nanotubes" or "CNT") which form rope-like agglomerates and contain at least 0.1% impurities. The compositions are distinguished by a reduced electrical resistance and a minimum notched impact strength. A process for the incorporation of CNT, wherein high shear forces are applied, and a process using a masterbatch are also disclosed.

U.S. Pat. No. 5,591,382 discloses polymer compositions containing carbon fibrils, at least some of which are present in the form of agglomerates. The agglomerates do not exceed a size of 35 µm. The composition is distinguished by reduced electrical resistance in combination with a minimum notched impact strength. A polymer composition in which agglomerates of the carbon fibrils are broken up by an incorporation process using shear forces, is also disclosed.

U.S. Pat. No. 6,265,466 discloses a polymer composition composed of polymer material and CNT which offers electromagnetic shielding, and a process the production thereof. The process involves the use of shear forces, e.g. in extrusion, to orientate the CNT.

JP-A 2006-083195 discloses polycarbonate compositions containing CNT and polyolefins. A process for the production thereof in which first of all the polyolefin is mixed with the CNT and then the polycarbonate added, is claimed.

SUMMARY OF THE INVENTION

An object of the present invention was therefore to provide a process for the production of an impact-modified polycarbonate composition and/or molding composition filled with carbon nanotubes ("CNT" or "fibrous graphite materials"), wherein degradation of the molecular weight of the polycarbonate during compounding is improved as compared with certain processes known from in art.

It was surprisingly found that a decrease in molecular weight of polycarbonate caused by degradation reactions of the polycarbonate during compounding can be reduced by utilizing a process according to the present invention. A process of the present invention involves (i) in a first step, mixing the CNT (component C) with rubber-containing vinyl copolymer (component B) and/or rubber-free vinyl copolymer (component D) on a twin screw extruder, to obtain a CNT masterbatch, (ii) in a second step, mixing the CNT masterbatch from the first step with an aromatic polycarbonate and/or aromatic polyester carbonate (component A) and optionally with component B and/or D and optionally with an additive (component E, infra) on a twin screw extruder.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION OF A PREFERRED EMBODIMENT

In a preferred embodiment, the first step preferably is conducted at a temperature of 240 to 300° C., particularly preferably 260 to 290° C. The ratio of the parts by weight of component C to the sum of the parts by weight of components B and D is preferably 2:98 to 25:75, particularly preferably 5:95 to 20:80. Components C, B and/or D can be introduced into the twin screw extruder simultaneously and/or sequentially, particularly preferably simultaneously. The resulting material is preferably granulated after the first step.

In a preferred embodiment, the second step is preferably carried out at a temperature of about 240-about 300° C., particularly preferably about 250-about 280° C. The components CNT masterbatch, A and optionally other constituents B and D and E optionally can be added in any order and are preferably added simultaneously and/or sequentially, particularly preferably simultaneously.

In general, mixing generally takes place in steps 1 and 2 of the process according to the present invention at conventional speeds and throughputs according to the art. However, speed and throughput, and any desired speed and throughput can be used as deemed useful for a particular situation or application.

A further object of the present invention is a composition comprising 30 to 94 parts by weight, preferably 49 to 73 parts by weight of Component A, 5 to 30 parts by weight, preferably 10 to 20 parts by weight of Component B, 1 to 10 parts by weight, preferably 2 to 6 parts by weight of Component C, and 0 to 30 parts by weight, preferably 15 to 25 parts by weight of Component D, whereby the specified amounts refer to the sum of parts by weights of the components A+B+C+D, and whereby the sum of the parts by weights of components A+B+C+D is normalized to 100.

Component A

Aromatic polycarbonates and/or aromatic polyester carbonates suitable according to the present invention according to component A are known in the literature and/or producible according to processes known in the literature (for the production of aromatic polycarbonates see for example Schnell, "Chemistry and Physics of Polycarbonates", Interscience Publishers 1964, and DE-AS 1 495 626, DE-A 2 232 877, DE-A 2 703 376, DE-A 2 714 544, DE-A 3 000 610, DE-A 3

832 396; for the production of aromatic polyester carbonates, e.g. DE-A 3 077 934, which are incorporated herein by reference).

The production of aromatic polycarbonates takes place, for example, by reacting diphenols with carbonic acid halides, preferably phosgene, and/or with aromatic dicarboxylic acid dihalides, preferably benzene dicarboxylic acid dihalides, according to the phase interface process, optionally using chain terminators, for example monophenols and optionally using trifunctional or more than trifunctional branchers, for example triphenols or tetraphenols. A production using a melt polymerization process by reacting diphenols with for example diphenylcarbonate, is likewise possible.

Diphenols for the production of aromatic polycarbonates and/or aromatic polyester carbonates are preferably those of formula (I)

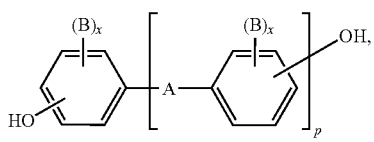

(I)

wherein
A means a single bond, $C_1$ to $C_5$ alkylene, $C_2$ to $C_5$ alkylides, $C_5$ to $C_6$ cycloalkylides, —O—, —SO—, —CO—, —S—, —$SO_2$—, $C_6$ to $C_{12}$ aryls to which other aromatic rings optionally containing heteroatoms can be condensed,
or a radical of formula (II) or (III)

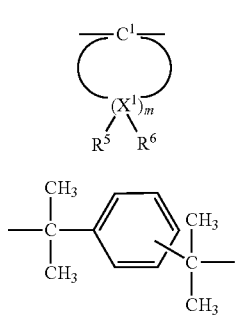

(II)

(III)

B in each case $C_1$ to $C_{12}$ alkyl, preferably methyl, halogen, preferably chlorine and/or bromine
x in each case independent of each other 0, 1 or 2,
p 1 or 0, and
$R^5$ and $R^6$ for each $X^1$, individually selected, independent of each another, hydrogen or $C_1$ to $C_6$ alkyl, preferably hydrogen, methyl or ethyl,
$X^1$ carbon and
m a whole number from 4 to 7, preferably 4 or 5, provided that on at least one atom $X^1$, $R^5$ and $R^6$ are simultaneously alkyl.

Preferred diphenols include hydroquinone, resorcinol, dihydroxydiphenols, bis-(hydroxyphenyl) $C_1$-$C_5$ alkanes, bis-(hydroxyphenyl) $C_5$-$C_6$ cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl) diisopropylbenzenes, and the nucleus-brominated and/or nucleus-chlorinated derivatives thereof.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenylsulfide, 4,4'-dihydroxydiphenylsulfone, and the di- and tetrabrominated or chlorinated derivatives thereof such as for example 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. Particularly preferred is 2,2-bis-(4-hydroxyphenyl)-propane (bisphenol A). The diphenols can be used alone or as any mixtures. The diphenols are obtainable as known in the literature or according to processes known in the literature.

Phenol, p-chlorophenol, p-tert.-butylphenol or 2,4,6-tribromophenol, but also long-chain alkylphenols such as 4-[2-(2,4,4-trimethylpentyl)]-phenol, 4-(1,3-tetramethylbutyl)-phenol according to DE-A 2 842 005 (incorporated herein by reference) or monoalkylphenol or dialkylphenols with in total 8 to 20 carbon atoms in the alkyl substituents, such as 3,5-di-tert.-butylphenol, p-iso-octylphenol, p-tert-octylphenol, p-dodecylphenol and 2-(3,5-deimethylheptyl)-phenol and 4-(3,5-dimethylheptyl)-phenol are, for example, suitable chain terminators for the production of the thermoplastic aromatic polycarbonates. The quantity of chain terminators to be used is, in general, between 0.5 mol % and 10 mol %, based on the molar sum of the diphenols used in each case.

The thermoplastic aromatic polycarbonates have average weight average molecular weights ($M_w$, measured e.g. by GPC, ultracentrifuge or light-scattering measurement) advantageously of 10,000 to 200,000 g/mol, preferably 15,000 to 80,000 g/mol, particularly preferably 24,000 to 32,000 g/mol.

The thermoplastic aromatic polycarbonates can be branched in a known way, preferably by incorporating, for example, 0.05 to 2.0 mol %, based on the sum of the diphenols used, of trifunctional or more than trifunctional compounds, for example those with three and more phenolic groups.

Both homopolycarbonates and copolycarbonates are suitable. Advantageously, 1 to 25 wt. %, preferably 2.5 to 25 wt. %, based on the total quantity of diphenols to be used, polydiorganosiloxanes with hydroxyaryloxy terminal groups can also be used to produce copolycarbonates according to the present invention according to component A. These are known from U.S. Pat. No. 3,419,634 (incorporated herein by reference) and producible according to processes known in the literature. The production of polydiorganosiloxane-containing copolycarbonate is described, for example, in DE-A 3 334 782 incorporated herein by reference.

Preferred polycarbonates include, in addition to the bisphenol A homopolycarbonates, the copolycarbonates of bisphenol A with up to 15 mol %, based on the molar sums of diphenols, other than preferably or particularly preferably named diphenols, in particular 2,2-bis(3,5-dibromo-4-hydroxyphenyl)-propane.

Aromatic dicarboxylic acid halides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a preferred ratio from 1:20 to 20:1.

In addition, a carbonic acid halide, preferably phosgene, can be used as a bifunctional acid derivative in the production of polyester carbonates.

In addition to the already named monophenols, the chlorocarbonic acid esters thereof and the acid chlorides of aromatic monocarboxylic acids that can optionally be substituted by $C_1$ to $C_{22}$ alkyl groups or by halogen atoms, and aliphatic $C_2$ to $C_{22}$ monocarboxylic acid chlorides, are possible as chain terminators for the production of the aromatic polyester carbonates.

The quantity of chain terminators is in each case, advantageously 0.1 to 10 mol %, based in the case of the phenolic chain terminators on mole diphenol and in the case of monocarboxylic acid chloride chain terminators on mole dicarboxylic acid dichloride.

The aromatic polyester carbonates can also contain incorporated aromatic hydroxycarboxylic acids if desired.

The aromatic polyester carbonates can be both linear and/or branched in a known way (see thereto DE-A 2 940 024 and DE-A 3 007 934, both of which are incorporated herein by reference).

Tri- or multifunctional carboxylic acid chlorides, such as trimesinic acid trichloride, cyanuric acid trichloride, 3,3'-,4,4'-benzophenone tetracarboxylic acid tetrachloride, 1,4,5,8-naphthalene tetracarboxylic acid tetrachloride or pyromellitic acid tetrachloride, in quantities of 0.01 to 1.0 mol % (based on dicarboxylic acid dichlorides used) or tri- or multifunctional phenols, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in quantities of 0.01 to 1.0 mol % based on diphenols used, for example, can be used as a branching agent. Phenolic branching agents can be presented with the diphenols, and/or acid chloride branching agents can be introduced together with the acid dichlorides if desired.

In the thermoplastic aromatic polyester carbonates, the content of carbonate structural units can vary arbitrarily. The content of carbonate groups is preferably up to 100 mol %, in particular up to 80 mol %, particularly preferably up to 50 mol %, based on the sum of ester groups and carbonate groups. Both the ester and also the carbonate content of the aromatic polyester carbonates can be present in the form of blocks, statistically distributed in the polycondensate, or in any possible distribution.

The relative solution viscosity ($\eta_{rel}$) of the aromatic polycarbonates and polyester carbonates is typically and advantageously in the range 1.18 to 1.4, preferably 1.20 to 1.32 (measured on solutions of 0.5 g polycarbonate or polyester carbonate in 100 ml methylene chloride solution at 25° C.).

The thermoplastic aromatic polycarbonates and polyester carbonates can be used alone or in any mixture.

Component B

Component B preferably comprises one or more graft polymers of

B.1 5 to 95, preferably 30 to 90 wt. %, of at least one vinyl monomer on

B.2 95 to 5, preferably 70 to 10 wt. %, of one or more graft bases with glass transition temperatures of <10° C., preferably <0° C., particularly preferably <−20° C.

Graft base B.2 has, in general, an average particle size ($d_{50}$ value) of 0.05 to 10 μm, preferably 0.1 to 5 μm, particularly preferably 0.2 to 1 μm.

B.1 monomers are preferably mixtures of

B.1.1 50 to 99 parts by weight vinyl aromatics and/or vinyl aromatics substituted in the nucleus (such as styrene, α-methylstyrene, p-methylstyrene, p-chlorostyrene) and/or (meth)acrylic acid ($C_1$-$C_8$) alkyl esters, such as methyl methacrylate, ethyl methacrylate) and B.1.2 1 to 50 parts by weight vinyl cyanides (unsaturated nitriles such as acrylonitrile and methacrylonitrile) and/or (meth)acrylic acid ($C_1$-$C_8$) alkyl esters, such as methyl methacrylate, n-butyl acrylate, t-butyl acrylate, and/or derivatives (such as anhydrides and imides), unsaturated carboxylic acids, for example maleic anhydride and N-phenyl maleic imide.

Preferred B.1.1 monomers are selected from at least one of the monomers styrene, α-methylstyrene and methyl methacrylate, preferred B.1.2 monomers are selected from at least one of the monomers acrylonitrile, maleic anhydride and methyl methacrylate. Particularly preferred monomers are B.1.1 styrene and B.1.2 acrylonitrile.

B.2 graft bases suitable for the B graft polymers are for example diene rubbers, EP(D)M rubbers, thus those based on ethylene/propylene and optionally diene, acrylate, polyurethane, silicone, chloroprene and ethylene/vinyl acetate rubbers. Also suitable are mixtures containing silicone rubber and acrylate rubber. For example the graft base is a physical mixture of the silicone rubber and acrylate rubber, or the silicone rubber and acrylate rubber may form an interpenetrating network, or the silicone rubber and acrylate rubber form a graft base having a core-shell structure.

Preferred B.2 graft bases are diene rubbers, for example based on butadiene and isoprene, or mixtures of diene rubbers or copolymers of diene rubbers or the mixtures thereof with other copolymerisable monomers (e.g. according to B.1.1 and B.1.2), provided that the glass transition temperature of component B.2 is below <10° C., preferably <0° C., particularly preferably <−10° C. Pure polybutadiene rubber is particularly preferred.

Particularly preferred B polymers are for example ABS polymers (emulsion, bulk and suspension ABS), as described e.g. in DE-OS 2 035 390 (=U.S. Pat. No. 3,644,574) or in DE-OS 2 248 242 (=GB_PS 1 409 275) or in Ullmanns Enzyklopädie der Technischen Chemie, vol. 19 (1980), pp 280 ff, all of which are incorporated herein by reference. The gel content of the B.2 graft base is preferably at least 30 wt. %, preferably at least 40 wt. % (measured in toluene).

The B graft copolymers can be produced by radical polymerization, e.g. by emulsion, suspension, solution or bulk polymerization, preferably by emulsion or bulk polymerization.

Particularly suitable graft rubbers also include ABS polymers which are produced in the emulsion polymerization process by redox initiation with an initiator system of organic hydroperoxide and ascorbic acid according to U.S. Pat. No. 4,937,285, incorporated herein by reference.

In a graft reaction, the graft monomers, as is known, are not necessarily completely grafted on to the graft base. Thus, according to the invention, "B graft polymers" also include those products that can be obtained by (co)polymerization of the graft monomers in the presence of the graft base and occur during processing.

Suitable acrylate rubbers according to B.2 of B polymers preferably include polymers of acrylic acid alkyl esters, optionally with up to 40 wt. %, based on B.2, other polymerisable, ethylenically unsaturated monomers. The preferred polymerisable acrylic acid esters include $C_1$ to $C_8$ alkyl esters, for example methyl, ethyl, butyl, n-octyl and 2-ethylhexyl esters, halogen alkyl esters, preferably halogen $C_1$-$C_8$ alkyl esters, such as chloroethyl acrylate and mixtures of these monomers.

Monomers with more than one polymerisable double bond can be copolymerized for crosslinking. Preferred examples of crosslinking monomers include esters of unsaturated monocarboxylic acids with 3 to 8 C atoms and unsaturated monovalent alcohols with 3 to 12 C atoms, or saturated polyols with 2 to 4 OH groups and 2 to 20 C atoms, such as ethylene glycol dimethacrylate, allyl methacrylate; multiply unsaturated heterocyclic compounds such as trivinyl and triallyl cyanurate; polyfunctional vinyl compounds, such as di- and trivinyl benzenes; but also triallyl phosphate and diallyl phthalate. Preferred crosslinking monomers include allyl methacrylate, ethylene glycol dimethacrylate, diallyl phthalate and heterocyclic compounds that have at least three ethylenically unsaturated groups. Particularly preferred crosslinking monomers are the cyclic monomers triallyl cyanurate, triallyl isocyanurate, triacryloyl hexahydro-s-triazine and triallyl benzenes. The quantity of the crosslinked monomers is preferably 0.02 to 5, in particular 0.05 to 2 wt. %, based on the B.2 graft base. With cyclic crosslinking monomers with at least three ethylenically unsaturated groups, it may be advantageous to restrict the quantity to less than 1 wt. % of the B.2 graft base.

Preferred "other" polymerizable, ethylenically unsaturated monomers that can optionally serve, in addition to acrylic acid esters, for the production of the B.2 graft base include e.g. acrylonitrile, styrene, α-methylstyrene, acrylamides, vinyl $C_1$-$C_6$ alkyl ethers, methyl methacrylate and butadiene. Preferred acrylate rubbers as B.2 graft base include emulsion polymers that have a gel content of at least 60 wt. %.

Other suitable graft bases according to B.2 are silicone rubbers with graft-active points, as described in DE-OS 3 704 657, DE-OS 3 704 655, DE-OS 3 631 540 and DE-OS 3 631 539, incorporated herein by reference.

The gel content of the B.2 graft base is determined at 25° C. in a suitable solvent (M. Hoffmann, H. Krömer, R. Kuhn, Polymeranalytik I und II, Georg Thieme-Verlag, Stuttgart 1977).

The average particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782-1796), incorporated herein by reference.

Component C

Carbon nanotubes (CNT) preferably comprise cylindrical carbon tubes with a carbon content of >95%, wherein these typically contain no amorphous carbon. The carbon nanotubes preferably have an external diameter from about 3 to about 80 nm, particularly preferably, about 5 to 20 nm. The average value of the external diameter is preferably about 13 to about 16 nm. The length of the cylindrical carbon nanotubes is preferably about 0.1 to about 20 µm, particularly preferably about 1 to about 10 µm. The carbon nanotubes generally include preferably from about 2 to 50, particularly preferably 3 to 15 graphite layers (also termed "strata" or "walls") which generally have a minimum internal diameter of about 2 to about 6 nm. These carbon nanotubes are also termed for example "carbon fibrils" or "hollow carbon fibres".

The production of the CNT used according to the invention is generally known (cf for example U.S. Pat. No. 5,643,502 and DE-A 10 2006 017 695 incorporated herein by reference); production takes place preferably according to a process disclosed in DE-A 10 2006 017 695 incorporated herein by reference, particularly preferably according to the process disclosed in example 3 of DE-A 10 2006 017 695.

Component D

Component D comprises one or more thermoplastic vinyl (co)polymers D.1 and/or polyalkylene terephthalates D.2.

Polymers of at least one monomer from the group of vinyl aromatics, vinyl cyanides (unsaturated nitriles), (meth) acrylic acid ($C_1$-$C_8$) alkyl esters, unsaturated carboxylic acids and derivatives (such as anhydrides and imides) of unsaturated carboxylic acids are suitable as D.1 vinyl (co)polymers. Particularly suitable are (co)polymers comprising D.1.1 50 to 99, preferably 60 to 80 parts by weight vinyl aromatics and/or vinyl aromatics substituted in the nucleus such as styrene, α-methylstyrene, p-methylstyrene, p-chlorostyrene) and/or (meth)acrylic acid ($C_1$-$C_8$) alkyl esters, such as methyl methacrylate, ethyl methacrylate), and D.1.2 1 to 50, preferably 20 to 40 parts by weight vinyl cyanides (unsaturated nitriles) such as acrylonitrile and methacrylonitrile and/or (meth)acrylic acid ($C_1$-$C_8$) alkyl esters, such as methyl methacrylate, n-butyl acrylate, t-butyl acrylate, and/or unsaturated carboxylic acids, such as maleic acid, and/or derivatives such as anhydrides and imides, unsaturated carboxylic acids, for example maleic anhydride and N-phenyl maleic imide).

The D.1 vinyl (co)polymers are resinous, thermoplastic and rubber-free. The copolymer composed of D.1.1 styrene and F.1.2 acrylonitrile is particularly preferred.

The (co)polymers according to D.1 are known and can be produced by radical polymerization, in particular by emulsion, suspension, solution or bulk polymerization. The (co) polymers have preferably average molecular weights Mw (weight average determined by light scattering or sedimentation) from about 15,000 to about 200,000.

The polyalkylene terephthalates of component D.2 are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates advantageously contain at least 80 wt. %, preferably at least 90 wt. %, based on the dicarboxylic acid component terephthalic acid radicals and advantageously at least 80 wt. %, preferably at least 90 mol %, based on the diol component ethylene glycol and/or 1,4-butanediol radicals.

The preferred polyalkylene terephthalates can optionally contain, in addition to terephthalic acid radicals, up to 20 mol %, preferably up to 10 mol %, radicals of other aromatic or cycloaliphatic dicarboxylic acids with 8 to 14 C atoms or aliphatic dicarboxylic acids with 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexane diacetic acid.

The preferred polyalkylene terephthalates can contain, in addition to ethylene glycol or 1,4-butanediol radicals, up to 20 mol %, preferably up to 10 mol %, other aliphatic diols with 3 to 12 C atoms or cycloaliphatic diols with 6 to 21 C atoms, e.g. radicals of 1,3-propanediol, 2-ethylpropanediol-1,3, neopentyl glycol, 1,5-pentanediol, 1,6-hexanediol, 1,4-cyclohexanedimethanol, 3-ethylpentanediol-2,4,2-methylpentanediol-2,4,2,2,4-trimethylpentanediol-1,3,2-ethyl hexanediol-1,3,2,2-diethylpropanediol-1,3,2,5-hexanediol, 1,4-di(β-hydroxyethoxy)-benzene, 2,2-bis-(4-hydroxycyclohexyl)-propane, 2,4-dihydroxy-1,1,3,3-tetramethyl cyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932, incorporated herein by reference).

The polyalkylene terephthalates can be branched, for example, by incorporating relatively small quantities of 3- or 4-valent alcohols or 3- or 4-basic carboxylic acids, e.g. according to DE-A 1 900 270 and U.S. Pat. No. 3,692,744, incorporated herein by reference. Examples of preferred branching agents include trimesic acid, trimellitic acid, trimethylolethane and trimethylolpropane, and pentaerythritol.

Particularly preferred are polyalkylene terephthalates that have been produced solely from terephthalic acid and the reactive derivatives thereof (e.g. the dialkyl esters thereof) and ethylene glycol and/or 1,4-butanediol, and mixtures of these polyalkylene terephthalates.

Mixtures of polyalkylene terephthalates preferably contain 1 to 50 wt. %, more preferably 1 to 30 wt. %, polyethylene terephthalate and preferably 50 to 99 wt. %, more preferably 70 to 99 wt. %, polybutylene terephthalate.

The polyalkylene terephthalates preferably used have, in general, an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscosimeter.

The polyalkylene terephthalates can be produced according to known methods (see e.g. Kunststoff-Handbuch, vol. VIII, pp 695 ff, Carl-Hanser-Verlag, Munich 1973, incorporated herein by reference).

Other Additives, Component E

The composition can contain other additives as component E. In particular, conventional polymer additives such as flame retardants (e.g. organic phosphorus or halogen compounds, in particular bisphenol A-based oligophosphate), antidrip agents (for example compounds of the substance classes of fluorinated polyolefins, silicones and aramid fibres), lubricants and mould release agents, for example pentaerythritol tetrastearate, nucleating agents, antistatics, stabilisers, fillers and reinforcing agents different from CNT (for example talc, glass fibres, mica, kaolin, $CaCO_3$ and glass flakes), and dyes and pigments (for example titanium dioxide or iron oxide) are possible as other additives according to component E.

For example, the composition according to the invention comprises 0.01 to 30 parts by weight, preferably 0.1 to 15 parts by weight (referred to the sum of parts by weight of A+B+C+D=100) of the additives according to component E.

The invention also provides compositions that are obtainable according to the process according to the invention.

These molding compositions can be used for the production of any type of molding. These can be produced, for example, by injection molding, extrusion and blow molding processes. A further form of processing is the production of moldings by thermoforming from previously produced sheets or films.

Examples of such moldings include any type of films, profiles, housing parts, e.g. for domestic appliances such as juice presses, coffee machines, mixers; for office equipment such as monitors, flatscreens, notebooks, printers, copiers; sheets, tubes, electrical installation ducts, windows, doors and other profiles for the construction sector (internal work and external applications), and electrical and electronic parts such as switches, plugs and sockets, and vehicle bodies and internal components for commercial vehicles, in particular for the automotive sector.

In particular, the molding compositions according to the present invention can also be used, for example, for the production of the following moldings or moulded parts: internal components for track vehicles, ships, aircraft, buses and other motor vehicles, housing for electrical equipment containing small transformers, housing for equipment for information processing and transmission, housing and cladding for medical equipment, massage equipment and housing therefor, toys for children, flat wall panels, housing for safety equipment, heat-insulated transport containers, moldings for sanitary and bath fittings, cover grids for fan openings and housing for garden equipment, as well as for other applications and uses as desired.

The following examples serve to further explain the invention.

EXAMPLES

Component A

Linear polycarbonate based on bisphenol A with a weight-averaged molecular weight Mw of 27500 g/mol (determined by GPC).

Component B

Component B is a mixture of 50 wt. % component B-1 and 50 wt. % component B-2.
Component B-1:
Copolymer composed of 72 wt. % styrene and 28 wt. % acrylonitrile with a weight-averaged molecular $M_w$ of 130 kg/mol (determined by GPC), produced according to the bulk process.
Component B-2:
ABS polymer, produced by emulsion polymerization of 43 wt. % (based on the ABS polymer) of a mixture of 27 wt. % acrylonitrile and 73 wt. % styrene in the presence of 57 wt. % (based on the ABS polymer) of a particle-shaped crosslinked polybutadiene rubber (average particle diameter $d_{50}$=0.35 μm).

Component C

Component C-0:
Production:
500 mg of a catalyst comprising the active components manganese (37 wt. %) and cobalt (43 wt. %), and the support materials magnesium oxide (10 wt. %) and aluminium oxide (10 wt. %) are placed in a quartz glass fluidized bed reactor with an internal diameter of 49 mm. The catalyst particles have a diameter between 100 μm and 125 μm. The reactor is heated from outside to a temperature of 650° C.; after rendering inert, a gas mixture consisting of 40 vol % ethylene, 40 vol % hydrogen and 20 vol % nitrogen with a temperature of 25° C. is passed into the apparatus through a glass frit at the lower end of the reactor; the gas empty tube speed under operating conditions is 31.64 cm/s. Carbon nanotubes form on the catalyst, as result of which the catalyst particles are broken and agglomerate particles of carbon nanotubes and catalyst residues are produced. The temperatures in the reactor at positions 1 cm, 5 cm and 15 cm above the glass frit are observed. After approx. 15 minutes, a clear drop in the temperature 1 cm above the frit is observed. After 31 minutes, the reaction is complete; after rendering inert and cooling, 81 g of product are taken from the reactor for which an average external diameter $d_{0.5}$ of 1.283 μm and a maximum external diameter $d_{0.9}$ of 1.625 μm are determined by means of laser diffraction measurement. The product taken is agglomerates of cylindrical carbon tubes with a carbon content of >95% which contain no amorphous carbon. The carbon nanotubes have an external diameter between 5 to 20 nm and an average of the external diameter of 13 to 16 nm. The length of the cylindrical carbon nanotubes is 0.1 to 20 μm. The carbon nanotubes consist of 3 to 15 graphite layers which have a minimum internal diameter of 2 to 6 nm.

Component D

Copolymer of 77 wt. % styrene and 23 wt. % acrylonitrile with a weight-averaged molecular weight $M_w$ of 130 kg/mol (determined by GPC), produced according to the bulk process.

Component E

E-1: pentaerythritol tetrastearate as lubricant/mould release agent
E-2: phosphite stabiliser, Irganox® B900, Ciba Speciality Chemicals
E-3: citric acid, anhydrous Production of the Molding Composition of Reference Example 1:

Components A, B, D and E are mixed in the proportion by weight given in Table 1 on a twin screw extruder (ZSK-25) (Werner und Pfleiderer) at a speed of 225 rpm and a throughput of 20 kg/h at a temperature of 260° C. and then granulated. All components are introduced into the twin screw extruder simultaneously.

Production of the Molding Compositions of Reference Examples 2 to 4:

(i) First step: Production of Component C-1 (reference)

15 wt. % of component C-0 with 85 wt. % component A are fed simultaneously on a twin screw extruder (ZSK-25) (Werner und Pfleiderer) at a speed of 225 rpm, at a throughput of 13 kg/h and at a temperature of 280° C., mixed and then granulated, wherein the CNT masterbatch C-1 is obtained.

(ii) Second step

The CNT masterbatch C-1 is mixed on a twin screw extruder (ZSK-25) (Werner und Pfleiderer) with the other components A, B, D and E in the proportion by weight given in Table 1 at a speed of 225 rpm and a throughput of 20 kg/h at a temperature of 260° C. and then granulated. All components are introduced into the twin screw extruder simultaneously.

Production of the Molding Compositions of Examples 5 to 7 According to the Invention:

(i) First Step: Production of Component C-2 (According to the Invention)

15 wt. % of component C-0 with 72.25 wt. % component B and 12.75 wt. % component C are fed simultaneously on a twin screw extruder (ZSK-25) (Werner und Pfleiderer) at a speed of 225 rpm, at a throughput of 10 kg/h and at a temperature of 280° C., mixed and then granulated, wherein the CNT masterbatch C-2 is obtained.

(ii) Second Step:

The CNT masterbatch C-2 is mixed on a twin screw extruder (ZSK-25) (Werner und Pfleiderer) with the other components A, B, D and E in the proportion by weight in each case given in Table 1, at a speed of 225 rpm and a throughput of 20 kg/h at a temperature of 260° C. and then granulated. All components are introduced into the twin screw extruder simultaneously.

Analytical Evaluation and Calculation of the Reduction of the Mw of the Polycarbonate Constituent of the Molding Compositions:

In each case, the average molecular weight (Mw) of the polycarbonate constituent of the resulting molding compositions is determined by means of GPC (with regard to with standards from bisphenol A polycarbonate).

The reduction of the molecular weight ($\Delta$Mw) is the difference that is produced from the average molecular weight of the polycarbonate constituent of reference example 1 and the average molecular weight of the polycarbonate constituent of the CNT-containing molding composition. According to the present technical object, the aim was to have a value for $\Delta$Mw that was as low as possible.

TABLE 1

Composition of the molding compositions and their properties

| Composition [wt. %] | 1 (ref.) | 2 (ref.) | 3 (ref.) | 4 (ref.) | 5 | 6 | 7 |
|---|---|---|---|---|---|---|---|
| A | 59.1 | 46.8 | 35.0 | 23.7 | 57.9 | 56.8 | 55.7 |
| B | 34.0 | 33.3 | 32.7 | 32.1 | 23.9 | 14.2 | 4.8 |
| C-1 | — | 13.1 | 25.6 | 37.7 | — | — | — |
| C-2 | — | — | — | — | 13.1 | 25.6 | 37.7 |
| D | 6.0 | 5.9 | 5.8 | 5.7 | 4.2 | 2.5 | 0.8 |
| E-1 | 0.75 | 0.73 | 0.72 | 0.71 | 0.73 | 0.72 | 0.71 |
| E-2 | 0.12 | 0.12 | 0.12 | 0.11 | 0.12 | 0.12 | 0.11 |
| E-3 | 0.1 | 0.1 | 0.1 | 0.1 | 0.1 | 0.1 | 0.1 |
| Calculated contents: | | | | | | | |
| Polycarbonate content [%] | 59.1 | 57.9 | 56.8 | 55.7 | 57.9 | 56.8 | 55.7 |
| Graft polymer content [%] | 17 | 16.7 | 16.3 | 16.0 | 16.7 | 16.3 | 16.0 |
| CNT content [%] | | 2.0 | 3.8 | 5.7 | 2.0 | 3.8 | 5.7 |
| SAN content [%] | 23 | 22.5 | 22.1 | 21.7 | 22.5 | 22.1 | 21.7 |
| Properties: | | | | | | | |
| Mw (polycarbonate content) [g/mol] | 25400 | 23400 | 20800 | 18300 | 24900 | 24900 | 24200 |
| % of original | — | 92% | 81% | 72% | 98% | 98% | 95% |
| $\Delta$Mw (polycarbonate content with regard to ref. 1) [g/mol] | — | 2000 | 4600 | 7100 | 500 | 500 | 1200 |

It follows from the examples that a process according to the invention (examples 5-7) with regard to reference examples 2-4 clearly leads to a smaller reduction in the average molecular weight (Mw) of the polycarbonate constituent of the resulting molding composition. Even at the highest concentration of carbon nanotubes (5.7%), by using the process according to the invention (example 7), the reduction of the average molecular weight (Mw) of the polycarbonate constituent is relatively low (i.e. a small value for $\Delta$Mw of 1200). However, for 5.7% CNT in the reference Ex. 4, the reduction was quite a bit higher, namely 7100. Even in the reference example with the lowest concentration 2.0% of carbon nanotubes (example 2) the Mw of the polycarbonate constituent in the resulting molding composition is still marked, i.e. 2000.

Therefore, in summary, for CNT % of from 2.0-about 6.0%, it is possible to achieve a final product that has a molecular weight (Mw) that is from 95%-98% or even greater than the original molecular weight without addition of the carbon nanotubes. This is simply not possible with what could have been achieved in the prior art such as shown in ref. ex. 2, 3, & 4. Moreover, the reduction in degradation of molecular weight for CNT % of 2.0-6.0% is from at least 8%-23% as compared to what is capable to achieve using prior art processes. This is shown in Table 1. Namely at 2% CNT, the reduction is 8%, for 3.8% CNT the reduction is 17% and for 5.7%, the reduction is 23%.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

What is claimed is:

1. A process for producing an impact-modified polycarbonate composition filled with carbon nanotubes, wherein said process produces reduced degradation in molecular weight of said polycarbonate, said process comprising:
   (i) in a first step, mixing a Component C comprising carbon nanotubes with Component B comprising a rubber-containing vinyl copolymer and/or Component D comprising a rubber-free vinyl copolymer on a twin screw extruder, to obtain a masterbatch,
   wherein:
      the rubber-containing vinyl copolymer of Component B comprises at least one graft polymer of
      B.1. 5 to 95 wt. % of at least one vinyl monomer on
      B.2. 95 to 5 wt. % of at least one graft base with glass transition temperatures of <10° C.,
      wherein the B.1 monomer consists of a mixture of
         B.1.1 50 to 99 parts by weight vinyl aromatics and/or vinyl aromatics substituted in the nucleus and/or (meth)acrylic acid ($C_1$-$C_8$) alkyl esters, and
         B.1.2 1 to 50 parts by weight vinyl cyanides and/or (meth)acrylic acid ($C_1$-$C_8$) alkyl esters, anhydrides and imides of unsaturated carboxylic acids; and
   Component D is selected from the group consisting of thermoplastic vinyl (co)polymers D.1 and terephthalates D.2,
      wherein D.1 vinyl (co)polymers comprise
         D.1.1 50 to 99 parts by weight vinyl aromatics and/or vinyl aromatics substituted in the nucleus and/or (meth)acrylic acid ($C_1$-$C_8$) alkyl esters, and
         D.1.2 1 to 50 parts by weight vinyl cyanides and/or (meth)acrylic acid ($C_1$-$C_8$) alkyl esters, and/or unsaturated carboxylic acids and/or anhydrides and imides of unsaturated carboxylic acids; and
   (ii) in a second step, mixing the masterbatch produced from step (i) with Component A comprising an aromatic polycarbonate and/or aromatic polyester carbonate and optionally with Component B and/or Component D and optionally with an additive on a twin screw extruder.

2. A process according to claim 1, wherein the first step is carried out at a temperature of from 240 to 300° C.

3. A process according to claim 1, wherein, in the first step, the ratio of the parts by weight of Component C to the sum of the parts by weight of Components B and D is 2:98 to 25:75.

4. A process according to claim 1, wherein, in the first step, Components C, B and/or D are introduced into the twin screw extruder simultaneously.

5. A process according to claim 1, wherein the second step is carried out at a temperature of from 240 to 300° C.

6. A process according to claim 1, wherein, in the second step, the masterbatch, component A and optionally Component B, and/or Component D and optionally said additive are fed simultaneously or sequentially.

7. A process according to claim 1, wherein after the first step, the masterbatch is granulated.

8. A process of claim 1, wherein said additive comprises a flame retardant, anti-drip agent, lubricant, mold release agent, nucleating agent, antistatic, stabilizer, filler, reinforcing agent, dye, and/or pigment.

9. A process according to claim 1, wherein B.1 the at least one vinyl monomer is present in an amount of 30 to 90 wt %.

10. A process according to claim 1, wherein B.2 the at least one graft base is present in an amount of 70 to 10 wt %.

11. A process according to claim 1, wherein D.1.2 comprises maleic acid.

12. A process according to claim 1, wherein the produced polycarbonate has an average molecular weight that is from 95% to 100% of the average molecular weight of the aromatic polycarbonate and/or aromatic polyester carbonate in component A.

13. A process according to claim 12, wherein the produced polycarbonate has an average molecular weight that is from 95% to 98% of the average molecular weight of the aromatic polycarbonate and/or aromatic polyester carbonate in component A.

14. A process according to claim 1, wherein the produced polycarbonate composition comprises
   A) 30 to 94 parts by weight of Component A,
   B) 5 to 30 parts by weight of Component B,
   C) 1 to 10 parts by weight of Component C, and
   D) 0 to 30 parts by weight of Component D.

15. A process according to claim 14, wherein the produced polycarbonate composition comprises
   A) 49 to 73 parts by weight of Component A,
   B) 10 to 20 parts by weight of Component B,
   C) 2 to 6 parts by weight of Component C, and
   D) 15 to 25 parts by weight of Component D.

16. A process according to claim 1, wherein the carbon nanotubes is present in an amount ranging from 2.0% (weight/weight) to 6.0% (weight/weight).

17. A process according to claim 1, wherein the carbon nanotubes have an external diameter ranging from about 3 nanometers to about 80 nanometers, have a length ranging from about 0.1 micrometers to about 20 micrometers, have from about 2 to 50 graphite layers, and have a minimum internal diameter ranging from about 2 nanometers to about 6 nanometers.

* * * * *